(12) United States Patent
Kosmowski

(10) Patent No.: US 8,132,966 B2
(45) Date of Patent: Mar. 13, 2012

(54) ROTARY FLEXURE AND AIR BEARING SUPPORT FOR ROTARY INDEXING SYSTEM

(75) Inventor: Mark Kosmowski, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 431 days.

(21) Appl. No.: 12/477,505

(22) Filed: Jun. 3, 2009

(65) Prior Publication Data

US 2010/0310200 A1 Dec. 9, 2010

(51) Int. Cl.
*F16C 32/06* (2006.01)

(52) U.S. Cl. ....................................... 384/124

(58) Field of Classification Search .......... 384/121, 384/124; 403/291, 220; 464/100, 98, 81, 464/84; 310/75 D
See application file for complete search history.

(56) References Cited

U.S. PATENT DOCUMENTS

| | | | |
|---|---|---|---|
| 1,460,212 A * | 6/1923 | Olive | 464/98 |
| 3,305,278 A * | 2/1967 | Cencel et al. | 384/121 |
| 3,950,042 A * | 4/1976 | Farmer et al. | 384/121 |
| 4,794,289 A * | 12/1988 | Barnaby | 310/90 |
| 5,540,120 A | 7/1996 | Sommer | |
| 5,784,932 A | 7/1998 | Gilberti | |

FOREIGN PATENT DOCUMENTS

JP 2001-212726 A 8/2001

* cited by examiner

*Primary Examiner* — Thomas R Hannon

(74) *Attorney, Agent, or Firm* — Young Basile

(57) ABSTRACT

A highly position-stabilized indexable table or "dial" in which the dial is supported relative to a steel surface on a frame by one or more air bearings. A flexure mechanically connects the indexing motor to the dial in such a way as to be torsionally non-compliant, but axially compliant to decouple the dial from the motor shaft along the Z-axis. In one embodiment, the air bearings are mounted to the frame at uniformly angularly displaced positions under the dial. In another embodiment, the bearings are partially integrated into the dial. Negative (suction) preload can be used in either embodiment to increase air bearing stiffness and/or to allow inverted processing; i.e., mounting part fixtures on an undersurface of the dial.

7 Claims, 6 Drawing Sheets

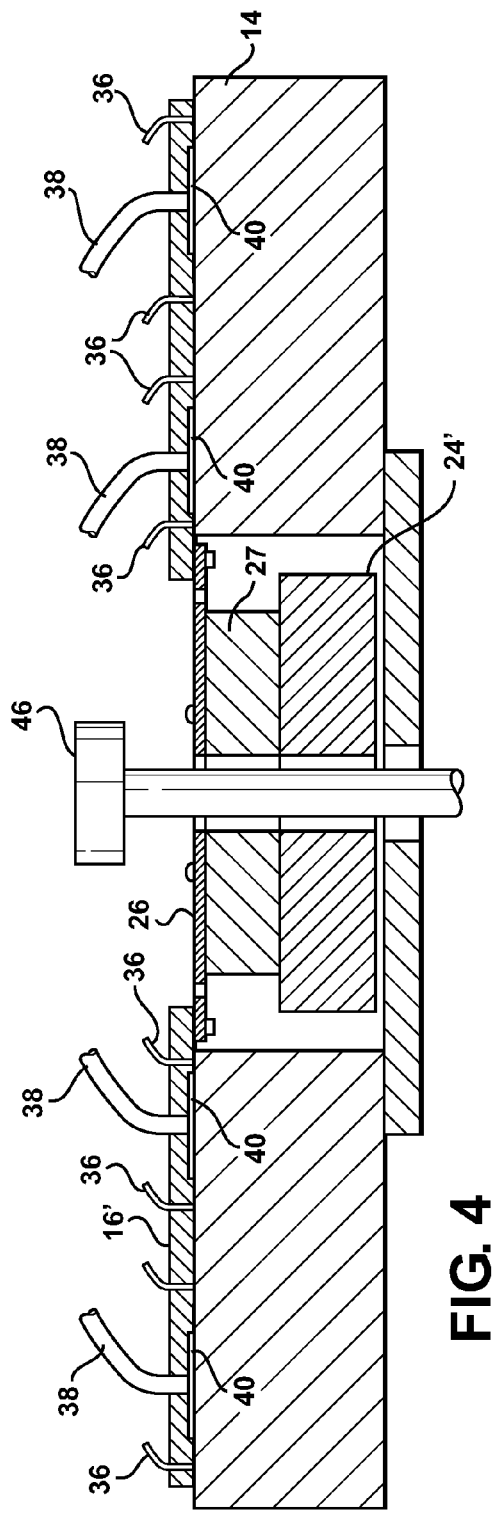
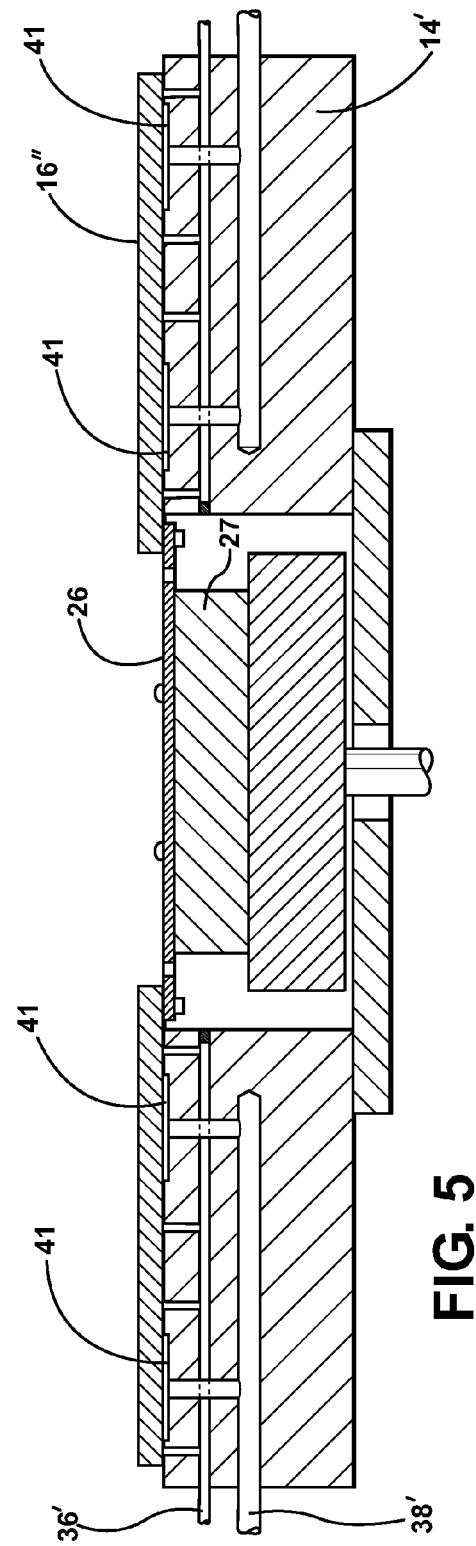

US 8,132,966 B2

ROTARY FLEXURE AND AIR BEARING SUPPORT FOR ROTARY INDEXING SYSTEM

FIELD OF THE INVENTION

This invention relates to supports, commonly called "dials", for precisely indexing fixtures for workpieces in and out of processing stations, such as laser drilling stations, and more particularly to a dial support system that protects the a against out-of-plane excursions while at the same time relaxing the performance specifications of bearings associated with a dial indexing motor.

BACKGROUND OF THE INVENTION

It is known to use rotatable dials to index workpieces in and out of processing stations, such as laser drilling stations, where precise control over the location of the workpiece is required. The dial is typically circular and has a central, vertical axis of rotation, referred to as the "Z-axis". A motor is mounted in a frame below the table for indexing the table on command. The frame typically includes a dimensionally-stable surface underlying the table.

In conventional rotary indexers, the mass of the dial is supported by bearings of the indexer motor bearings. To protect the dial against out-of-plane excursions; large, expensive and highly precise indexer motor bearings are required so as to minimize play in the thrust direction; i.e., along the axis of rotation, and in tipping or tilting as a result of radial play. In the case of large diameter dials; i.e., dials of one meter or more in diameter, expensive measures have been taken to prevent tipping or tilling when vertical forces are applied near the outer edge of the dial. The measures include increasing the size of the indexer thrust bearings and adding outrigger structures that engage the dial when in an indexing location. Larger thrust bearings add cost, and the outriggers consume processing time and can cause positional errors.

SUMMARY OF THE INVENTION

Embodiments of the present invention provide for a high degree of stability and protection against out-of-plane excursions for indexable dials without the expense of larger indexer thrust bearings and without the problems created by selectively engageable outriggers. In brief, the invention removes the task of supporting the dial mass from the indexer.

In general, this is accomplished first through the use of a flexure element mechanically interconnecting the indexer and the dial, and second by an air bearing system supporting the dial. The flexure element is non-compliant in torsion while at the same time essentially decoupling the table from the indexer along the Z-axis. The air bearing system supports the dial mass and allows smaller, less expensive indexers to be used.

As hereinafter described, the air-bearing arrangement can take several forms and may incorporate vacuum preloading as well as partial integration into the dial structure. For a complete understanding of the invention, reference should be taken to the following description of illustrative embodiments thereof.

BRIEF SUMMARY OF THE DRAWINGS

The description herein makes reference to the accompanying drawings wherein like reference numerals refer to like parts throughout the several views and wherein:

FIG. 4 is a schematic cross-section of an alternative support system for the dial of FIG. 1;

FIG. 5 is a schematic cross-section of a second alternative support system;

DETAILED DESCRIPTION OF THE ILLUSTRATIVE EMBODIMENTS

Figure 1:
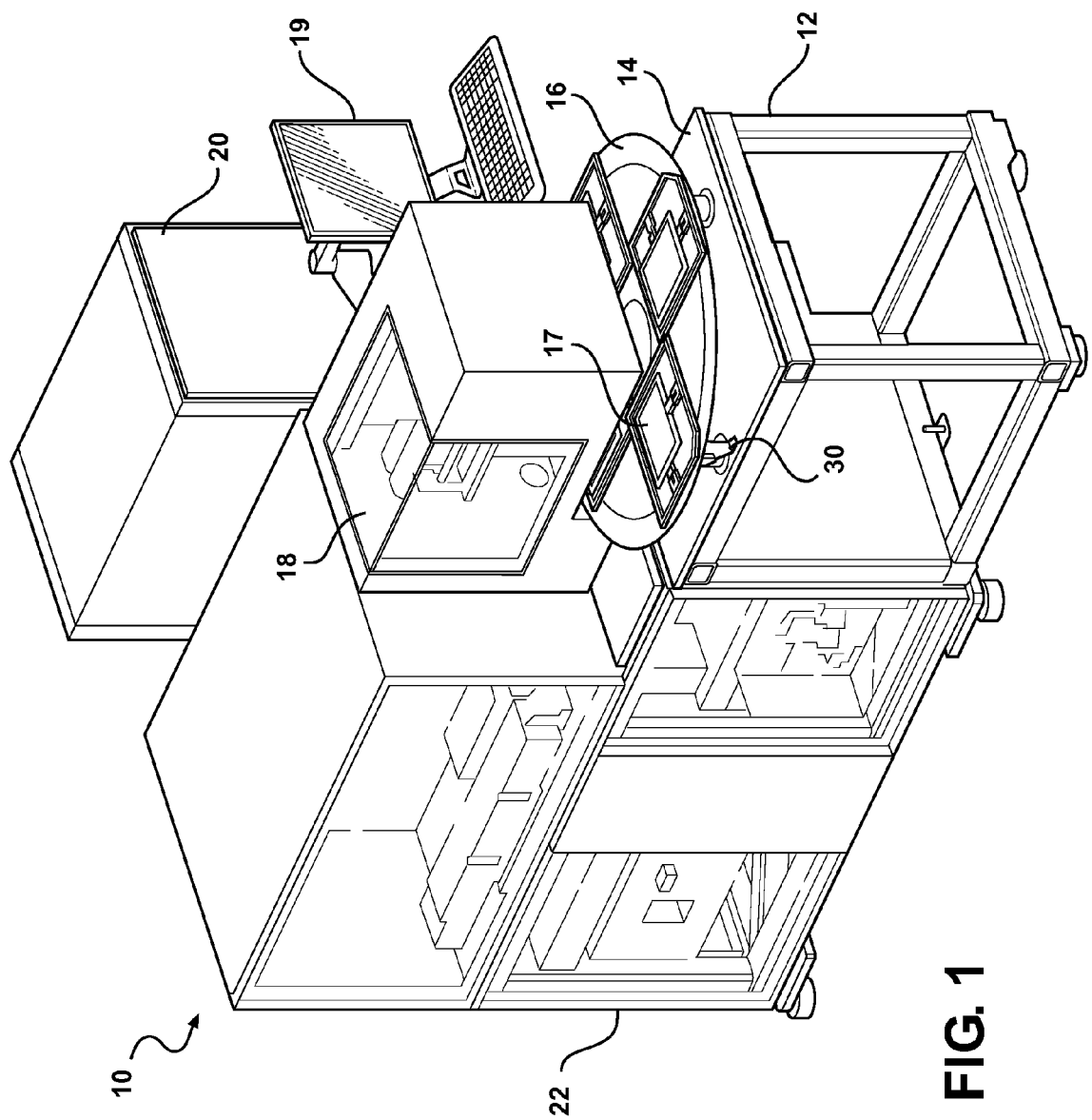
FIG. 1 is a perspective drawing of a laser drilling system incorporating the invention.

Referring to FIG. 1, there is shown a laser drilling system 10 comprising a frame 12 supporting a steel plate 14, the top surface of which is leveled. Supported above the plate 14 is an indexable dial 16 supported by a system of air bearings 28 hereinafter described. The indexable dial 16 is designed to receive workpieces on fixtures 17 that allow the workpieces to be precisely positioned for processing steps such as laser drilling performed by a laser system 18 under the control of a real time computer 20. As soon as the dial 16 is on position, a command to verify alignment and laser a workpiece is given. A programming station 19 is provided. The balance of the system 10 comprises housings 22 for subsystems for providing power, temperature control, air processing and other needs for the laser system 18. Details of such system components may be found in co-pending application Ser. No. 12/394,966 filed Feb. 27, 2009 and assigned to Electro Scientific Industries, Inc.

Figure 2:
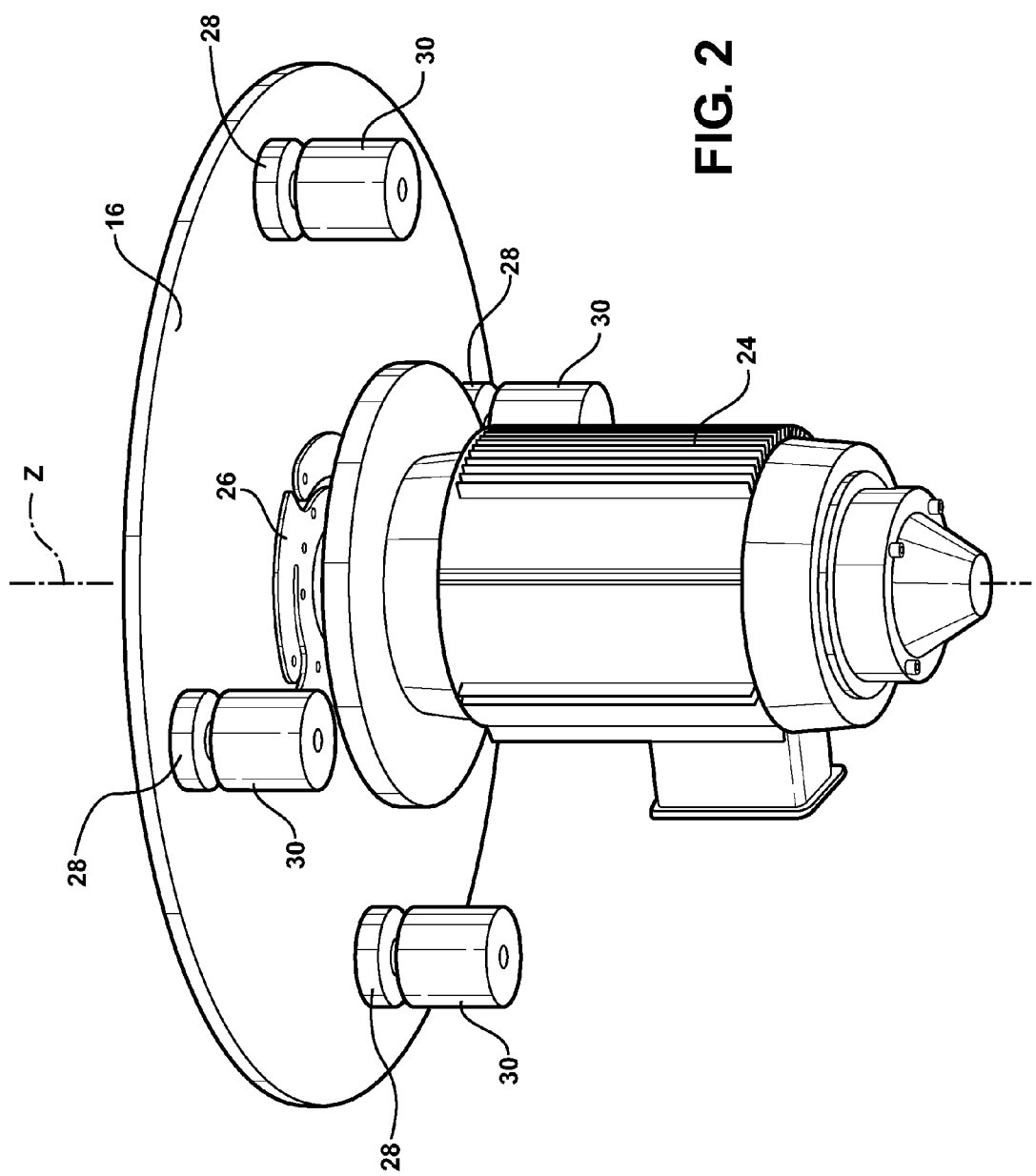
FIG. 2 is a perspective drawing of a first dial support system for the drilling system of FIG. 1.
Figure 3:
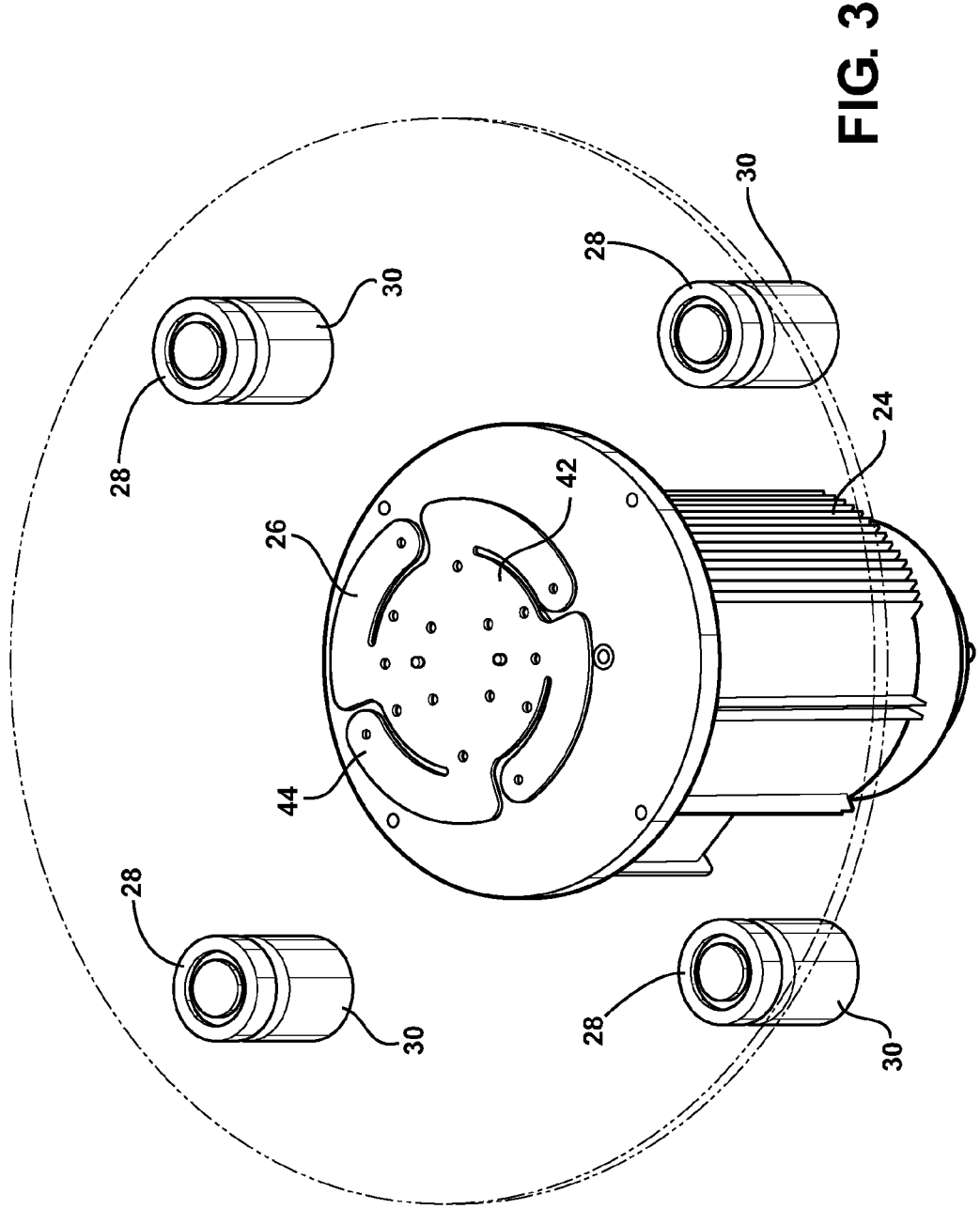
FIG. 3 is a perspective drawing of the first dial support system of FIG. 2 from another angle.
Figure 6:
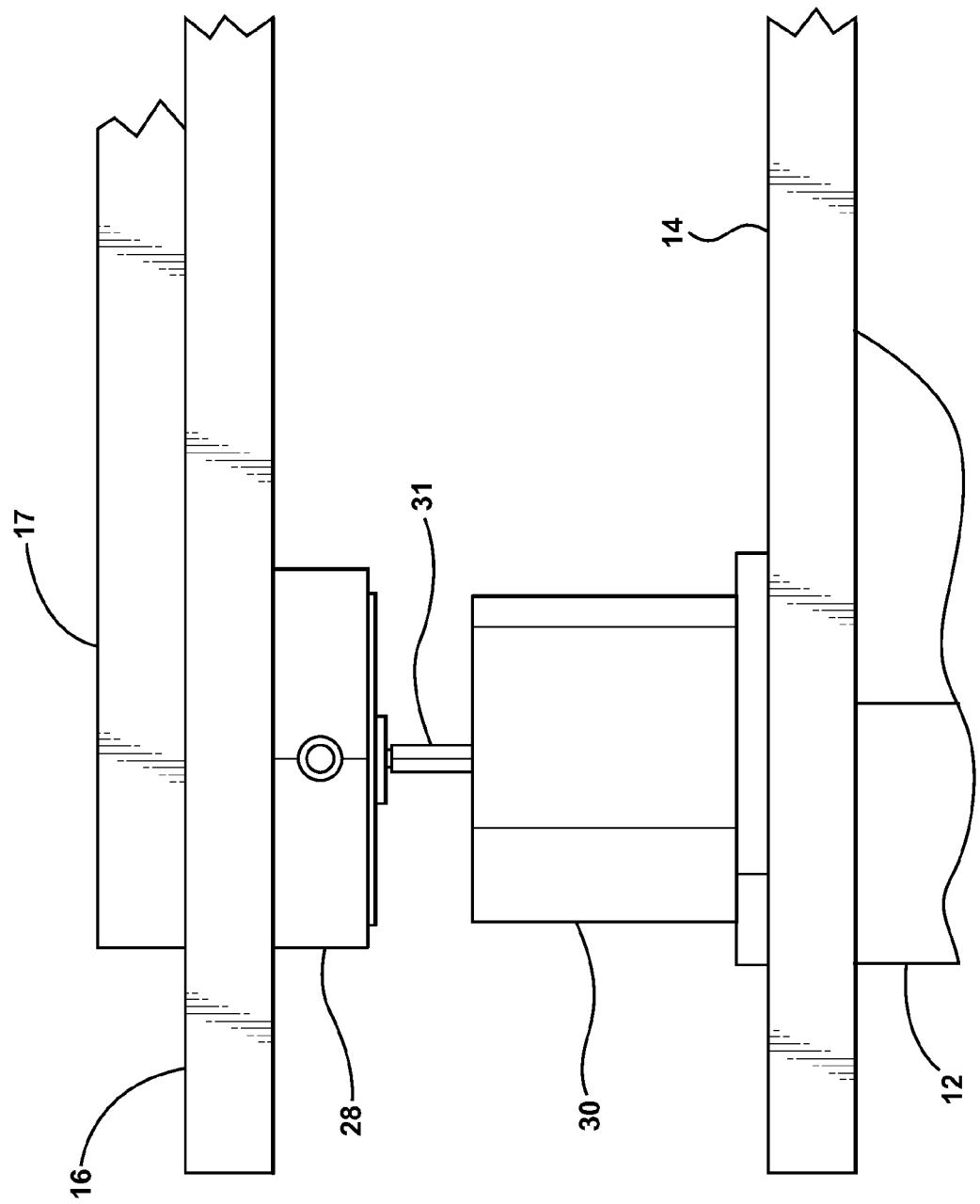
FIG. 6 is a partial schematic side view of an exemplary air bearing installation.

Referring now to FIGS. 2, 3 and 6, a first support system for the dial 16 will be described. The dial 16 is shown as circular and is mounted for rotation about a vertical Z-axis by an indexing motor 24 secured to the frame 12. FIGS. 2 and 3 show the dial 16 supported by four equally circumferentially- and radially-spaced air bearings 28, which may be of a type available from New Way Air Bearings of Philadelphia, PA. According to that company's product literature, their bearings produce a fluid film achieved by supplying a flow of air under positive pressure through a porous carbon diffuser in the bearing. New Way Air Bearings are susceptible to use in a combination positive air flow/vacuum mode using both positive air pressure and vacuum ports to provide vacuum preloading, a feature that can be used to advantage in the present invention as it adds stiffness to the air bearings 28. FIG. 6 shows how the bearings 28 are mounted to the plate 14 by means of a standoff 30 and a spherical joint 31 with a fine pitch thread. The standoff 30 is attached to the plate 14, and the joint 31 is attached to the bearing 28.

FIGS. 2 and 3 show how the dial 16, which may be up to or in excess of one meter in diameter, is mechanically interconnected to the output shaft S of the motor 24 through a flexure member 26, which is a plate-like structure made of low carbon steel. The flexure member 26 has a substantially circular center section 42 directly attached to an output member of the motor 24, such as output shaft S, by two screws- and four flexure arms 44 that are attached by screws to the bottom of the dial 16 in the relationship shown in FIG. 2. (See also FIG. 4.) The configuration of the flexure member 26 is such as to be stiff in torsion; i.e., it transmits torque from the motor 24 to the dial 16 in a highly non-compliant way. However, the flexure arms 44 allow substantial compliance along the Z-axis so as to prevent excursions of the motor output shaft S along the Z-axis from being transmitted to the dial 16. In short, the flexure member 26 selectively decouples the dial 16 from the motor 24 along the Z-axis.

The air bearings 28 lie approximately 12 to 15 inches radially outwardly from the center of the rotating structure shown in FIGS. 2 and 3 and thus provide substantial support for the dial 16 when supplied by positive pressure from a source (not shown). As also discussed above, the air bearings 28 may be operated in a dual mode by connecting to a vacuum source thereby to provide vacuum preloading, which increases the stiffness of the air bearings 28 and also permits rapid switching to a mode in which the vacuum preload dominates and effectively sucks the bottom surface of the dial 16 onto the upper surface of the bearings 28 for positional stability during, for example, a laser drilling process. While four bearings are shown, it will be understood that a greater or lesser number may be used, three being the minimum in the case of discreet bearings.

Referring now to FIG. 4, a first alternative embodiment of the invention is shown. In FIG. 4, the motor shown at 24' is mechanically connected to the flexure member 26 through a spacer 27, which is an output member of motor 24'. Flexure arms 44 of flexure member 26 are in turn fastened to the underside of the dial 16'. The dial 16' is shown sitting closely adjacent to the top surface of the plate 14. The plate 14, as shown in FIG. 1, is supported by the frame 12. A vacuum and compressed air slip ring/manifold structure 46 provides compressed air to bearing inlets 36 that exit as orifices from the underside of the dial 16' to provide the lifting aspects of the air bearings 28. Circular recesses or concavities 40 are milled into the underside of the dial 16' and are connected by vacuum lines 38 to a vacuum source through the slip ring manifold structure 46 to provide the vacuum preloading aspect described above. The positive air pressure to the bearing inlets 36 can be shut off, thus creating a vacuum that draws the underside of the dial 16' to the top surface of the plate 14 as previously described.

The flexure member 26 prevents Z-axis excursions from passing from the motor 24' to the dial 16', whereas the air bearings 28 provided by bearing inlets 36 and vacuum lines 38 with recesses 40 maintain the stability of the dial 16' during and between indexing operations. The flexure member 26 also allows the dial 16' to drop down against the plate surface as described above.

FIG. 5 shows a still further embodiment of the invention in which the positive and negative air pressure conduits 36' and 38', respectively, run through or under the plate 14' rather than through the dial 16" such as in the embodiment of FIG. 4. The embodiment thus eliminates the need for a rotary coupling, such as slip ring/manifold structure 46, to supply air to the dial 16". In the embodiment of FIG. 5, compressed air from external of plate 14' flows via lines or conduits 36' to orifices in the plate 14' under dial 16" while lines or conduits 38' are attached to an external vacuum source to draw a vacuum in milled concavities 41 in the plate 14'. Controls can be provided for regulating the positive and negative pressure flows independently of one another.

Figure 7:
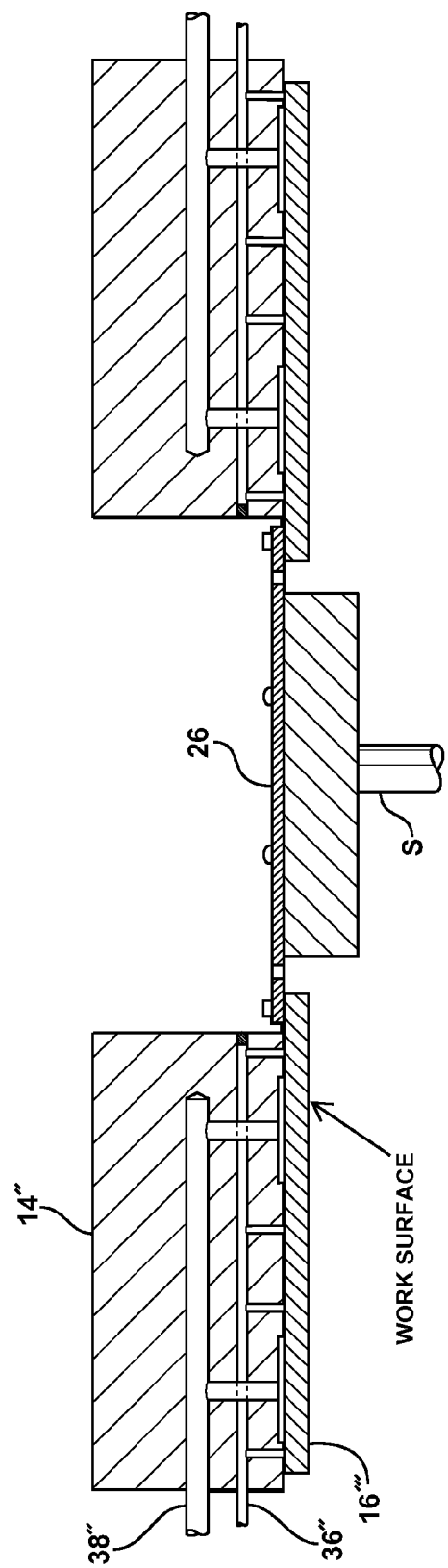
FIG. 7 is a partial schematic side view of an inverted dial embodiment.

While the invention has been described with reference to several embodiments in which the dial overlies the bearings, it is within the scope of the invention to locate and size the vacuum system such that it holds the dial 16 against gravity, thus allowing parts to be processed in an inverted manner as desired. Such an embodiment is shown in FIG. 7, where the dial 16''' is below the plate 14". The air pressure conduits 36" and 38" are similar to those of FIG. 5 but suction via conduits 38" holds the dial 16''' against gravity. The indexer, indexing motor 24, is represented by separator 27 and output shaft S and is under the dial 16'''. However, the indexing motor 24 but may also be above the dial 16'''.

What is claimed is:

1. An indexable dial system for translating workpieces in and out of a processing station comprising:
    a dial having an axis of rotation;
    a motor for selectively indexing the dial about said axis;
    air bearing means supporting said dial; and
    a flexure mechanically connecting said motor to said dial, said flexure being essentially torsionally non-compliant about said axis but compliant along said axis.

2. A system according to claim 1 wherein the air bearing means comprises a plurality of air bearings at spaced locations around said axis.

3. A system as defined in claim 2 further comprising a frame supporting said motor, said plurality of air bearings being attached to said frame under said dial.

4. A system as described in claim 1 wherein said air bearing means is formed in part in the underside of said dial.

5. A system as defined in claim 1 further including means for providing a negative pre-load on said air bearing means.

6. A system as defined in claim 1 further comprising a frame and wherein said air bearing means are mounted to said dial, said air bearing means further comprising vacuum means for providing pneumatic forces tending to draw said dial toward said frame.

7. A system as defined in claim 1 wherein the air bearing means is arranged to hold the dial against the force of gravity such that the dial is inverted.

* * * * *